United States Patent
Gerrard

(10) Patent No.: US 7,140,624 B2
(45) Date of Patent: *Nov. 28, 2006

(54) ARM FOR A MOTOR-VEHICLE INDEPENDENT SUSPENSION SYSTEM AND A MOTOR-VEHICLE INDEPENDENT SUSPENSION SYSTEM COMPRISING THE ARM

(75) Inventor: Miles Barnaby Gerrard, Turin (IT)

(73) Assignee: Sistemi Sospensioni S.p.A., Turin (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/030,136

(22) Filed: Jan. 7, 2005

(65) Prior Publication Data

US 2005/0127634 A1    Jun. 16, 2005

Related U.S. Application Data

(62) Division of application No. 10/231,339, filed on Aug. 30, 2002, now Pat. No. 6,860,499.

(30) Foreign Application Priority Data

Sep. 3, 2001  (IT)  ........................... TO2001A0843

(51) Int. Cl.
*B60G 3/18* (2006.01)
(52) U.S. Cl. .................... 280/124.135; 280/124.138
(58) Field of Classification Search ......... 280/124.134, 280/124.135, 124.136, 124.138, 124.143, 280/124.15, 124.139, 124.14
See application file for complete search history.

(56) References Cited

U.S. PATENT DOCUMENTS 3,584,895 A * 6/1971 Uemura et al. ....... 280/124.134

| 3,693,746 | A | 9/1972 | Yamamoto |
| 3,893,701 | A | 7/1975 | Kroniger |
| 4,863,188 | A | 9/1989 | Killian |
| 5,176,398 | A | 1/1993 | Kanai et al. |
| 5,364,121 | A | 11/1994 | Lee |
| 5,845,926 | A | 12/1998 | Davis et al. |
| 6,089,583 | A | 7/2000 | Taipale |
| 6,860,499 | B1 * | 3/2005 | Gerrard ............... 280/124.135 |

FOREIGN PATENT DOCUMENTS

| EP | 0 598 933 A | 6/1994 |
| EP | 0 933 241 A | 8/1999 |
| FR | 2 691 109 A | 11/1993 |

OTHER PUBLICATIONS

Patent Abstracts of Japan, vol. 14, No. 193 (M-0963), Apr. 19, 1990 & JP 02 037008 A; Mazda Motor Corp.; Feb. 7, 1990.

* cited by examiner

*Primary Examiner*—David R. Dunn
(74) *Attorney, Agent, or Firm*—Sughrue Mion, PLLC

(57) ABSTRACT

In a motor-vehicle independent suspension system, an arm interposed between a respective wheel carrier and the vehicle body comprises at least two flexible beam-like elements in the form of blades which are articulated to the wheel carrier and to the body by means of bushes and are interconnected by at least one torsionally stiff longitudinal tubular element. The inertial characteristics of the cross-sections of the blades are such that the blades are compliant with respect to bending in a direction substantially perpendicular to their axis. By virtue of their inherent flexibility, the blades provide the arm with a third, structural degree of freedom with respect to a shear axis having a predetermined orientation.

16 Claims, 6 Drawing Sheets

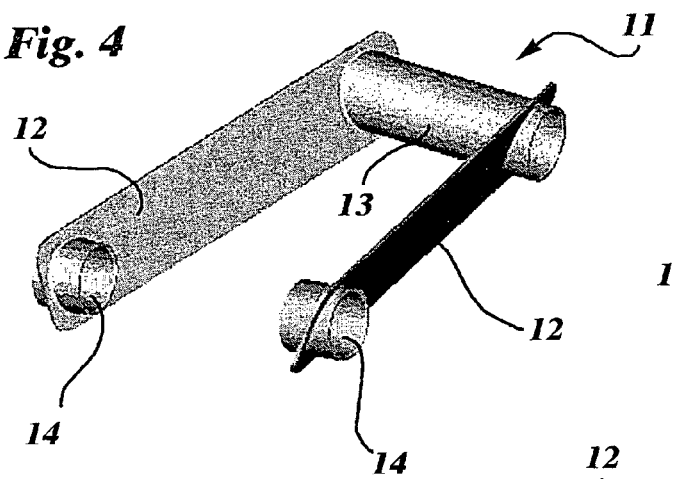
Fig. 4
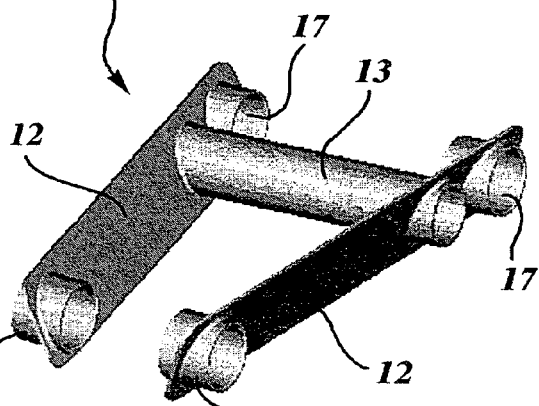
Fig. 5
Fig. 6
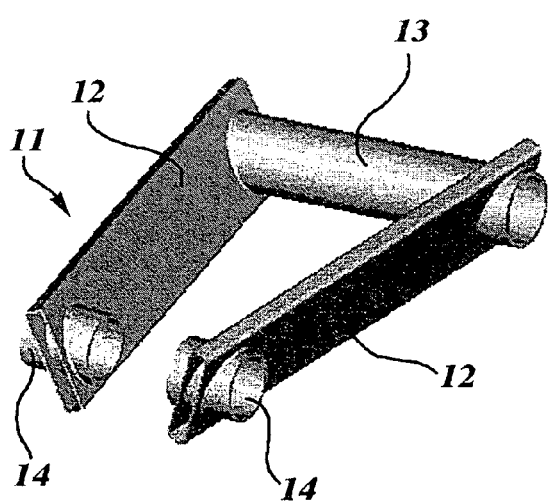
Fig. 7
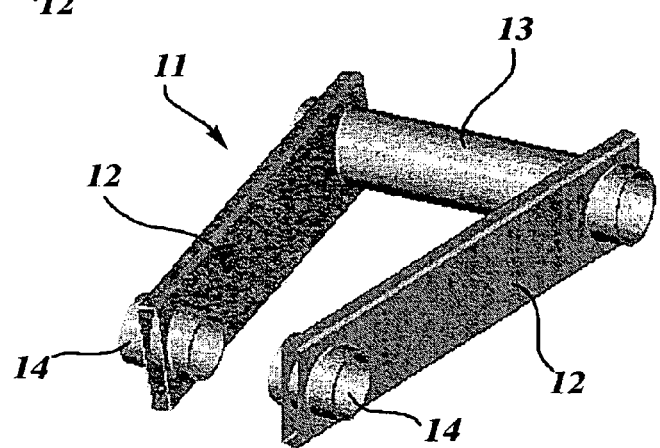

*Fig. 10a*
*Fig. 10b*
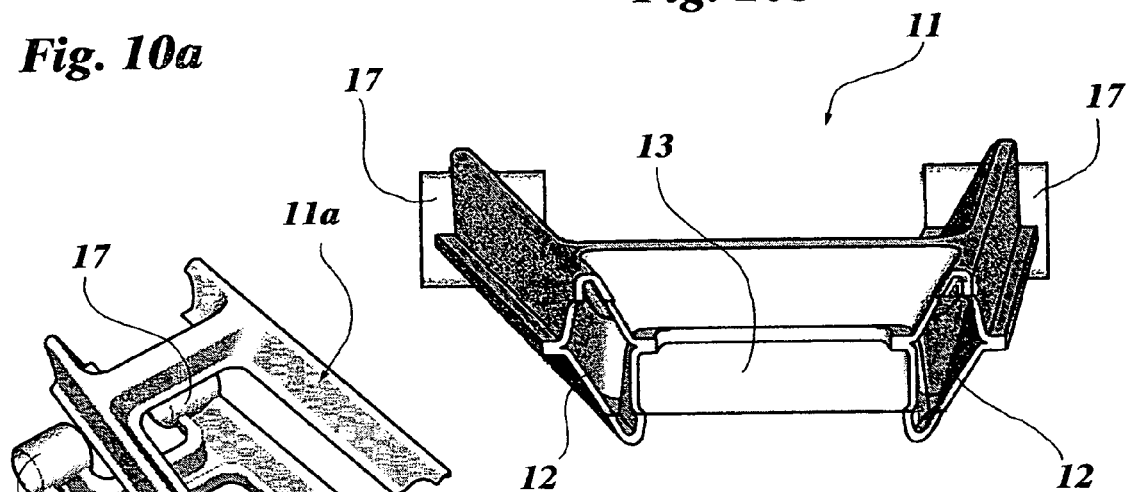
*Fig. 11*
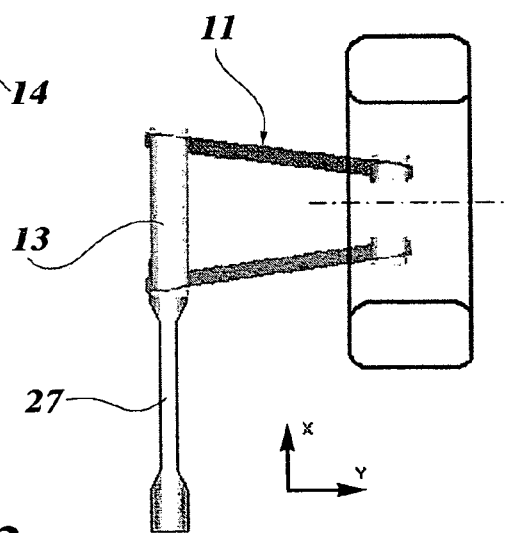
*Fig. 12*
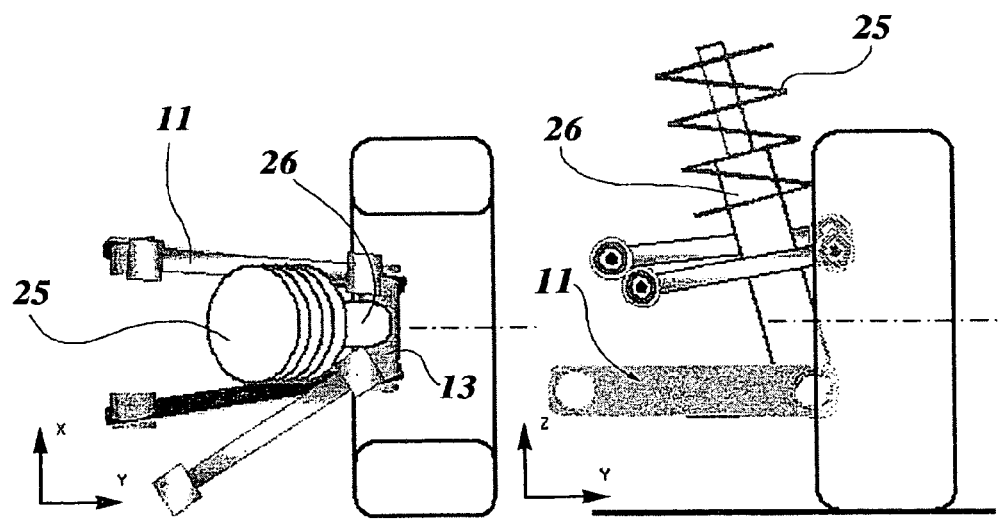

ARM FOR A MOTOR-VEHICLE INDEPENDENT SUSPENSION SYSTEM AND A MOTOR-VEHICLE INDEPENDENT SUSPENSION SYSTEM COMPRISING THE ARM

This is a Divisional of application Ser. No. 10/231,339 filed Aug. 30, 2002, now U.S. Pat. No. 6,860,499. The entire disclosure of the prior application, application Ser. No. 10/231,339 is considered part of the disclosure of the accompanying divisional application and is hereby incorporated by reference.

BACKGROUND OF THE INVENTION

The present invention relates to an arm for a motor-vehicle independent suspension system. According to a further aspect, the present invention relates to a motor-vehicle independent suspension system comprising an arm of the above-mentioned type.

For a better understanding of the prior art on the subject in question and of the problems relating thereto, a general outline of motor-vehicle suspension systems and of the requirements which they are called upon to satisfy will be provided first of all.

As is known, the system for the suspension of the wheels of a motor vehicle is the set of components which connect the wheels to the body of the vehicle, controlling their relative displacement in response to the forces applied.

The suspension system may be considered simply as a resilient element having characteristics of stiffness, in relation to all six degrees of freedom existing between the wheels and the body of the vehicle, such as to satisfy predetermined requirements such as, for example, the capability to permit large displacements of the wheels in a substantially vertical direction. A suspension system for a road vehicle of recent design must perform mainly the following two functions:

- connecting the wheels to the vehicle body in a resiliently compliant manner in order to insulate the occupants from roughness and unevenness in the road surface, and
- reacting in a sufficiently stiff manner to the forces acting upon the wheels, particularly during steering and braking, to ensure a quick and reliable response to the driver's commands.

The simultaneous presence of these conflicting requirements for resilient compliance and stiffness obliges suspension-system manufacturers to seek compromise solutions but these succeed only with difficulty in satisfying in an acceptable manner both of these requirements for occupant comfort and control of vehicle response.

SUMMARY OF THE INVENTION

The object of the present invention is to provide an improved motor-vehicle suspension system which can satisfy both of the above-mentioned requirements for occupant comfort and vehicle handling and control by virtue of an appropriate control of the kinematic and structural degrees of freedom of the system, and which can also be manufactured at low cost so that it can advantageously be produced on a large scale.

This object is achieved in full according to the present invention by means of an arm for a motor-vehicle independent suspension system having the characteristics claimed herein.

According to a further aspect of the invention, the above-mentioned object is achieved by means of a motor-vehicle independent suspension system as defined in claim 20. Preferred embodiments of the motor-vehicle independent suspension system according to the invention claimed herein.

BRIEF DESCRIPTION OF THE DRAWINGS

The invention will be described in greater detail below purely by way of non-limiting example, with reference to the appended drawings, in which:

FIGS. 4 to 7 are perspective views illustrating respective further preferred embodiments of a twin-blade arm according to the invention, FIGS. 10A and 10B are a partially-exploded perspective view and a longitudinally-sectioned view, respectively, of a further preferred embodiment of a twin-blade arm according to the invention, FIG. 11 is a plan view of a twin-blade arm according to the invention, connected to the torsion bar of a motor-vehicle independent suspension system, FIGS. 12 to 20 are respective plan and side elevational views of preferred embodiments of a motor-vehicle independent suspension system comprising a twin-blade arm according to the invention.

DETAILED DESCRIPTION OF THE INVENTION

In the description and in the appended claims, terms such as "longitudinal" and "transverse", "inner" and "outer", "front" and "rear" are to be intended as referred to the condition of mounting on the vehicle. Moreover, a reference system X, Y, Z which is commonly used in the automotive field, in which the X axis defines the longitudinal axis of the vehicle, the Y axis the transverse axis, and the Z axis the vertical axis, is introduced in the figures of the appended drawings.

Figure 1:
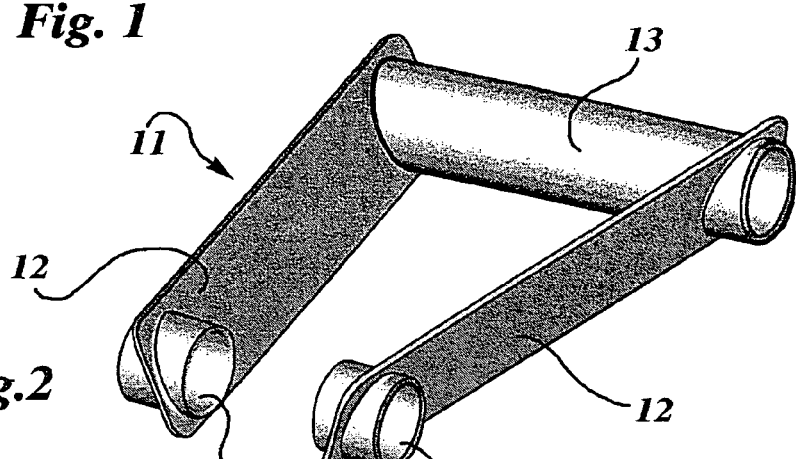
FIG. 1 is a perspective view of a first preferred embodiment of a twin-blade arm for a motor-vehicle independent suspension system according to the present invention.
Figure 2:
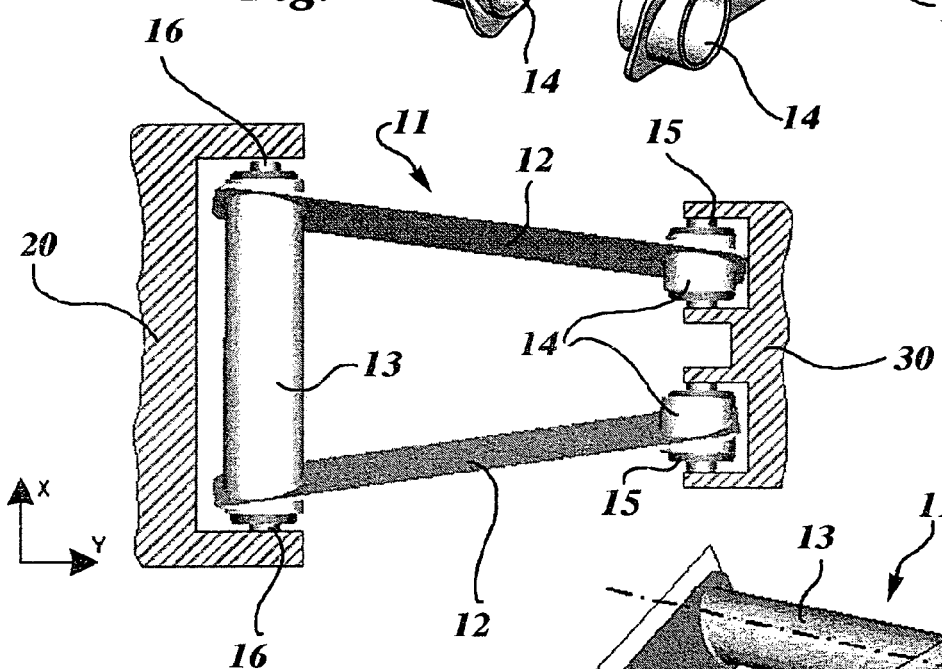
FIG. 2 is a plan view which shows the mounting of the arm of FIG. 1 on the vehicle.

With reference initially to FIGS. 1 and 2, an arm 11 interposed between the vehicle body 20 and the respective wheel carrier 30 comprises, according to the invention, a pair of blades 12, each blade being a substantially beam-like structural element with a cross-section having inertial characteristics such that the element is compliant with respect to bending in a direction substantially perpendicular to its own axis. In particular, the cross-section of the blades 12 is shaped in a manner such as to have a principal moment of inertia, with respect to a first principal axis of inertia, that is greater than its principal moment of inertia with respect to a second principal axis of inertia, perpendicular to the first.

Figure 3:
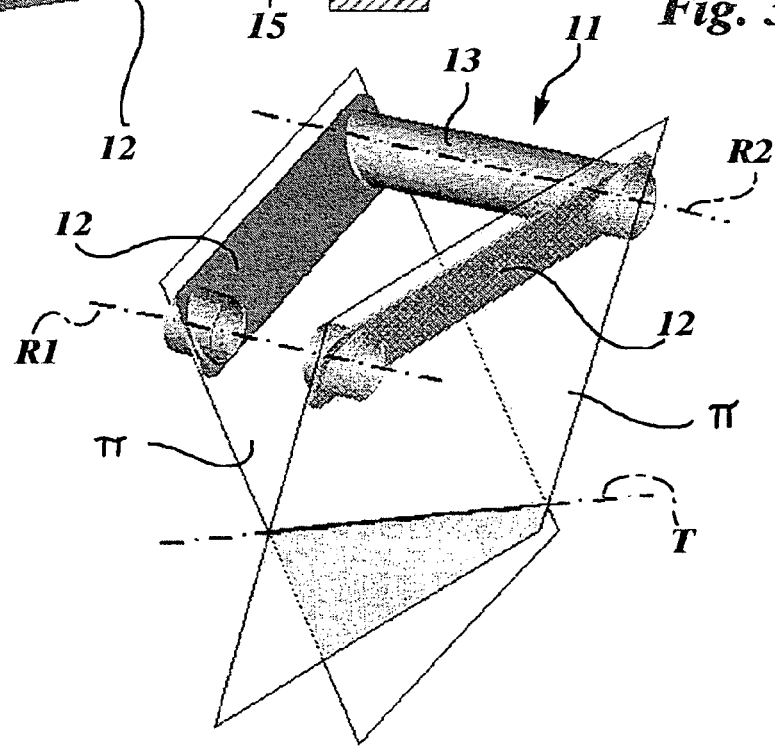
FIG. 3 shows the three axes relative to which the three rotational degrees of freedom (two kinematic and one structural) of the arm of FIG. 1 are permitted.

For example, in the embodiment shown in FIGS. 1 to 3, the blades 12 have thin rectangular cross-section and the first principal axis of inertia therefore corresponds to the axis of symmetry of the rectangular cross-section oriented parallel to the longer side of the rectangle. In this case, therefore, each blade 12 is complaint with respect to bending in the direction perpendicular to the central plane of its own cross-section.

The blades 12 are interconnected at one end, for example, at the transversely inner end, by a tubular element 13 of longitudinal axis, which enables the necessary reaction torque to be exerted, about the transverse axis Y, between the wheel carrier 30 and the vehicle body 20, in order to oppose the braking torque acting upon the wheels. As can clearly be seen in FIGS. 1–3, the blades 12 are suitably oriented in space in a manner such as, for example, to be non-parallel to one another both in the horizontal plane X-Y and in the longitudinal vertical plane X-Z.

Mounting members 14 of substantially longitudinal axes are fixed to the outer ends of the blades 12 for housing respective bushes 15 suitable for forming the articulated connection between the blades and the wheel carrier 30. A further pair of bushes 16 mounted, for example, inside the tube 13 which connects the two blades 12, forms the articulated connection between the arm 11 and the vehicle body 20.

With reference in particular to FIG. 3, it can be seen that, by virtue of its articulation on the bushes 15 and 16, the arm 11 has two kinematic degrees of freedom for rotation about a first axis R1 and about a second axis R2, respectively. Moreover, owing to the inherent flexibility of the blades 12, the arm 11 also has a third "structural" degree of freedom about a third axis T, or shear axis. The axis T can be constructed geometrically as the intersection of two planes $\pi$ each of which extends through the longitudinal axis of the respective blade 12 and through the first principal axis of inertia of its cross-section (that is, the axis to which the greatest moment of inertia corresponds). In the embodiment of FIG. 3, the axis T is thus defined by the straight line of intersection between the central planes of the two blades 12. It is nevertheless to be taken into account that this construction is based on an approximation, the accuracy of which decreases as the ratio between the principal moments of inertia of the cross-sections of the blades 12 decreases and as the torsional stiffness of the connection tube 13 decreases.

The third degree of freedom about the shear axis T has been referred to above as "structural", since it is not a true degree of freedom in the kinematic sense, that is, a degree of freedom which is defined by a geometrical constraint, as are the rotational degrees of freedom about the axis R1 and R2 of the bushes 15 and 16. Since this third "structural" degree of freedom is not defined by the geometry of a connection member which is physically present on the arm 11 (as the bushes 15 and 16 are) but by the inherent flexibility of the components of the arm with respect to the shear axis T, it is not constrained to pass through any part of the arm but can be set at the design stage by suitable definition of the geometry of the blades 12. Moreover, this "structural" degree of freedom is not completely free; although it is sufficiently compliant with respect to the other modes of deflection of the arm 11 to be considered really a degree of freedom, it nevertheless offers some torsional stiffness with respect to the axis T. Also this stiffness can be controlled during the design of the arm by suitable definition of the inertial characteristics of the cross-sections of the blades 12.

Naturally, the embodiment described previously with reference to FIGS. 1–3 is only one of the large number of embodiments which may be implemented to ensure a position of the shear axis T and a torsional stiffness with respect to that axis which allow the suspension system to conform to the required elasto-kinematic behaviour.

FIGS. 4 to 7 show some embodiments of a twin-blade arm according to the invention. Naturally, these embodiments should not be interpreted as in any way limiting but have the sole purpose of illustrating sufficiently broadly the possible scope of feasibility of the invention.

For example, the inclination of the blades 12 in the horizontal plane X-Y may be either convergent toward the outside of the vehicle, as in the arm of FIGS. 1–3, or diverging, as in the arm of FIG. 4.

It was stated previously that the tubular element 13 which connects the two blades 12 has the sole function of opposing the braking torque acting upon the arm 11. The element 13 need not therefore necessarily be interposed between the transversely inner ends of the blades (FIGS. 1–3) but may equally well be disposed in any intermediate position between the ends of the blades, for example, as shown in FIG. 5. In this latter case, mounting members 17 similar to the members 14 are fixed to the inner ends of the blades 12 for supporting the bushes 16 for articulation to the vehicle body.

Another fundamental design parameter, in addition to the spatial orientation of the blades 12, is the shape of the cross-section of the blades themselves, which can be selected freely at the designer's discretion, provided that it has inertial characteristics such as to offer much less stiffness with respect to bending in one direction than in the direction perpendicular thereto. The blades 12 do not therefore necessarily have to have a solid cross-section, as in the embodiments discussed above, but may have hollow cross-sections. This latter solution thus offers the advantage of a high buckling resistance. FIGS. 6 and 7 show two embodiments of arms provided with two hollow-sectioned blades having, in particular, a rectangular shape with the first principal axis of inertia oriented substantially vertically, which arms differ from one another solely in the orientation of the blade in the longitudinal vertical plane X-Z. Clearly, however, many other possible cross-sectional shapes of the blades, including open shapes, are equally applicable.

Similarly, also the tubular connection element 13 may have a cross-section of a shape other than the circular shape of the embodiments shown, provided that the shape selected ensures high torsional strength.

Figure 8:
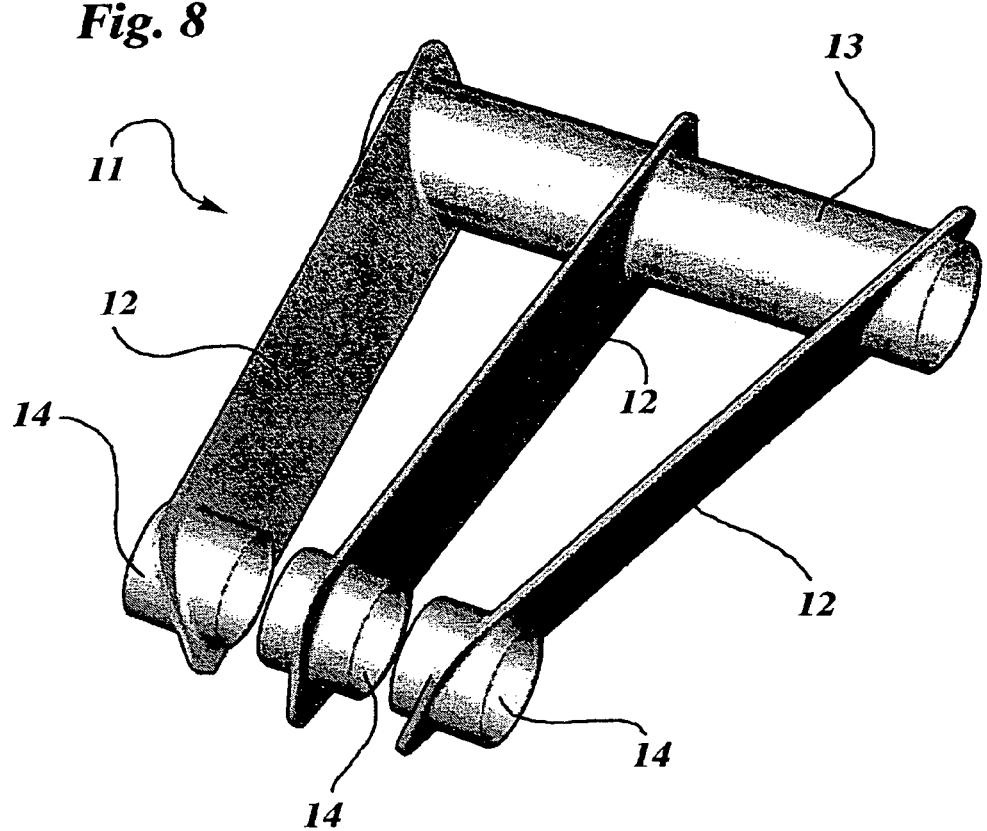
FIGS. 8 and 9 show, in perspective, respective preferred embodiments of a three-blade arm according to the invention.
Figure 9:
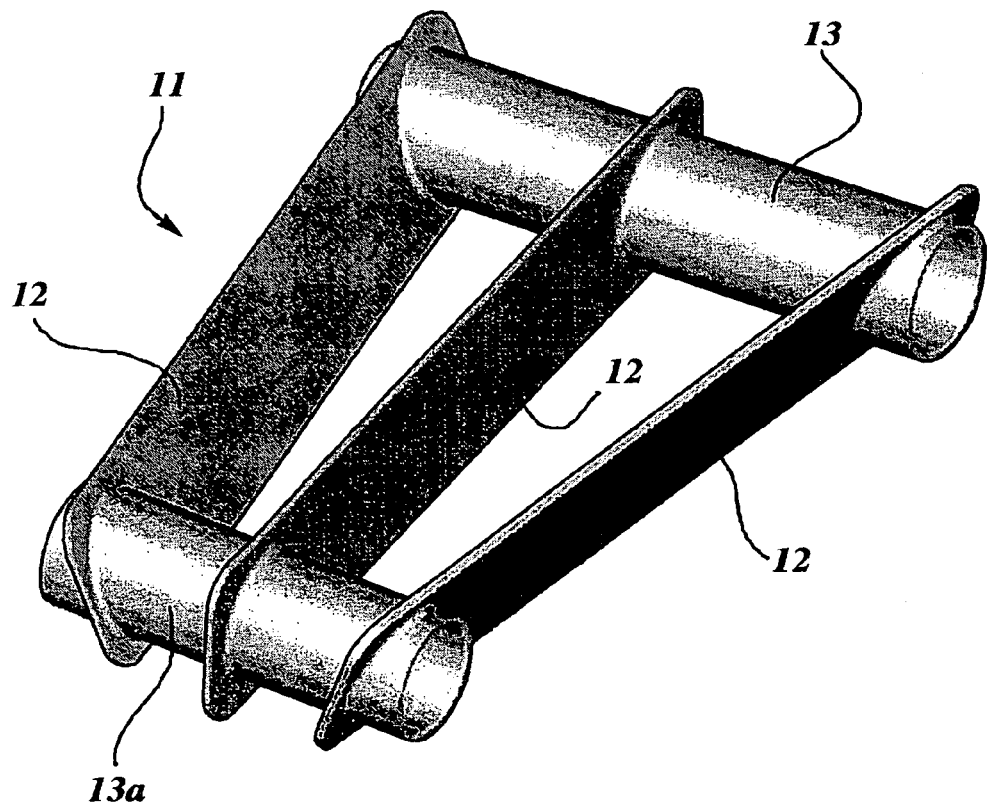
Figure 13:
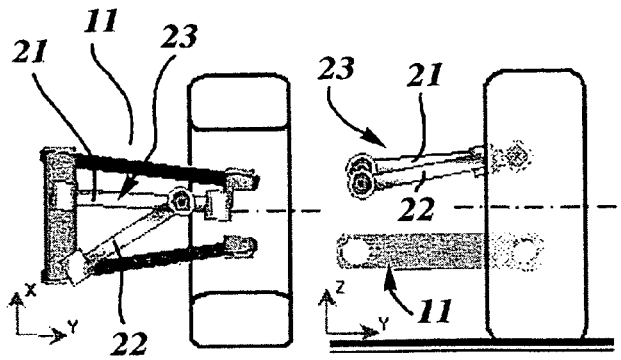
Figure 14:
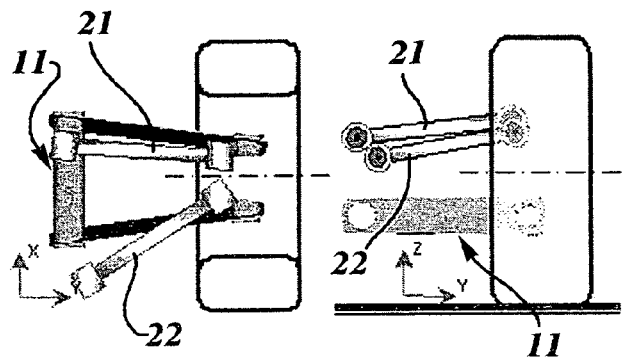
Figure 15:
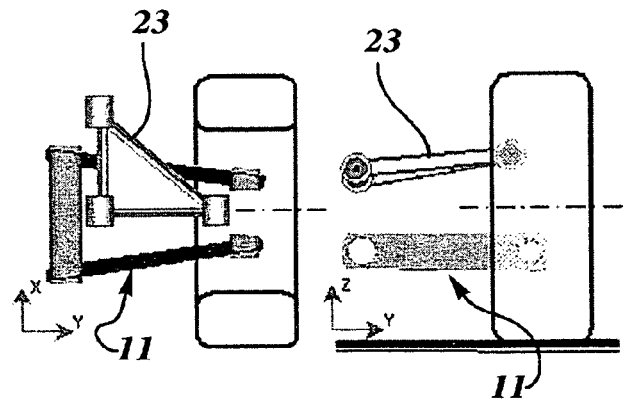

With reference now to FIGS. 8 and 9, it can be seen that the present invention also provides for the possibility of the construction of an arm having more than two blades and, in this embodiment, three blades. More specifically, the embodiment of FIG. 8 differs from that of FIGS. 1 to 3 simply by the addition of a third flexible, blade-shaped, beam-like element 12 in a longitudinally intermediate position. Also, the third blade 12 of the arm 11 is welded, at its transversely inner end in this embodiment, to the torsionally stiff tubular element 13 whereas, at the opposite end, it is fixed to a third mounting member 14 of substantially longitudinal axis, for housing a respective third bush 15 (not shown). In the embodiment of FIG. 9, it can be seen that the ends of the three blades 12 remote from those which are fixed to the tubular element 13 are also fixed, for example, by welding, to a second torsionally stiff tubular element 13a, substantially parallel to the tube 13. Naturally, this solution is also applicable in just the same way to a twin-blade arm of the type shown in the drawings described previously.

For a three-blade arm, the geometrical construction of the shear axis T (about which the arm has the above-mentioned third "structural" degree of freedom) as the intersection of the central planes of the blades 12 is less precise than with a twin-blade arm but is still useful at the design stage for establishing the elasto-kinematic behaviour of the arm.

FIGS. 10A and 10B show a further embodiment of an arm according to the invention (which, in this case, is a twin-blade arm but may equally well be an arm with more than two blades) which can be manufactured at low cost and is therefore particularly suitable for mass-production. According to this embodiment, the blades 12 and the torsionally stiff tubular connection element 13 are formed as two pressed pieces, that is, an upper piece 11a and a lower piece 11b, respectively, and have rhombic and rectangular cross-sections, respectively. As can clearly be seen in FIG. 10B, the longitudinal axes of the blades 12 are inclined to one another in the plane X-Y and the principal axes of inertia of the cross-sections of the blades 12 are inclined to one another in the plane X-Z so as to provide a shear axis T having an orientation similar to that of the embodiment shown in FIGS. 1 to 3.

An arm according to the invention imposes no constraints on the kinematic performance of the suspension system in which it is fitted, neither does it necessarily have to satisfy predetermined geometrical conditions in order to be able to function. For example, it is not necessary either for the transversely inner and outer sets of bushes 15 and 16 to be parallel to one another or for the bushes forming part of each set to be parallel to one another.

The arm 11 may also be connected, according to the invention, to springs, shock-absorbers, or anti-roll bars of the suspension system in which it is mounted. In the embodiment of FIG. 11, a situation is shown in which the tubular element 13 of a twin-blade 11 of the type shown in FIG. 1 is connected directly to a torsion bar 27. FIG. 12, on the other hand, shows schematically a suspension system provided with a twin-blade arm in which the tubular element 13 is interposed between the transversely outer ends of the blades 12 and provides a support base for a spring and shock-absorber unit 25, 26.

Conventional wishbones eliminate four of the six degrees of freedom of the wheel carrier relative to the vehicle body and thus require a single additional constraint (typically a camber rod) to remove the remaining fifth degree of freedom, thus leaving solely the vertical translational movement of the wheel carrier free.

The arm of the present invention, on the other hand, eliminates only three degrees of freedom and therefore has to be associated with two additional constraints, one for opposing camber deflections and one for providing further stiffness in the longitudinal direction. The arm 11 can therefore be used together with conventional rigid rods which eliminate the remaining two degrees of freedom of the wheel carrier, leaving free solely the translational degree of freedom in the substantially vertical direction.

Figure 16:
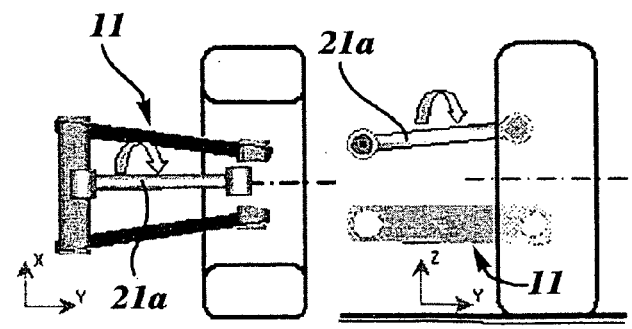

FIGS. 13 to 16 give some examples of independent suspension architectures in which the twin-blade arm 11 is associated with a further constraint element for eliminating the remaining two degrees of freedom of the wheel carrier 30 relative to the vehicle body 20. These constraint elements are:

a pair of transverse rods 21 and 22 connected to one other to form a single A-arm 23 (FIG. 13),
a pair of separate transverse rods 21 and 22 (FIG. 14),
an A-arm 23 (FIG. 15), and
a transverse rod 21a capable of reacting both to tension/compression and to torsion (FIG. 16).

In all of these examples, the arm 11 is shown below the axis of rotation of the wheel but it may equally well also be disposed above that axis.

The condition that two further degrees of freedom should be eliminated to complete the architecture of the suspension system is not, however, always valid. By virtue of a particular definition of the resilient characteristics of the arm 11, it is also possible to produce a suspension system in which the arm is associated with constraint elements which can eliminate only one additional degree of freedom. In fact, if the torsional stiffness of the arm 11 with respect to the shear axis T is great enough as, for example, in the embodiments of FIGS. 6 to 10B, it is then possible to remove only one further degree of freedom of the wheel carrier 30 with respect to the vehicle body 20.

Figure 17:
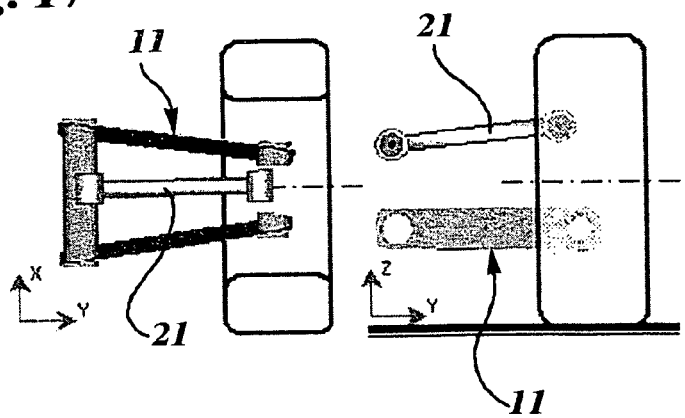
Figure 18:
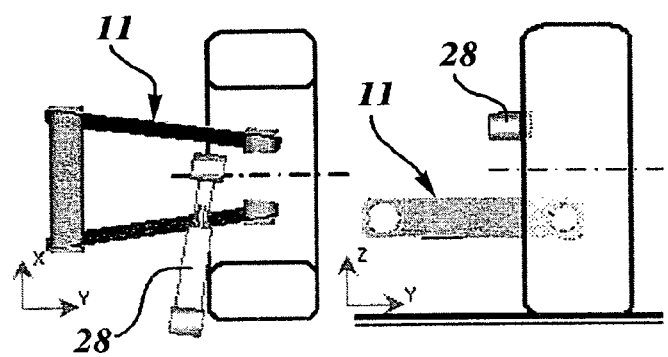

This can be achieved with the use, for example, of a simple transverse rod 21 for controlling camber, as shown in FIG. 17. The solution of FIG. 18, in which there is a longitudinal rod 28 capable of reacting solely to torsional stresses is, however, equally feasible.

Figure 19:
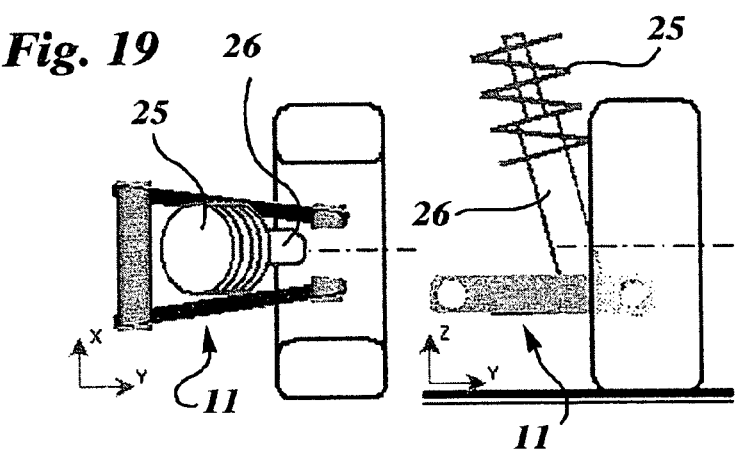

A further possible arrangement for an independent suspension system comprising a twin-blade arm according to the invention is shown in FIG. 19. In this case, the use of a structural unit comprising a spring 25 and a shock-absorber 26 (McPherson), which eliminates two degrees of freedom of the wheel carrier, permits a further reduction in the manufacturing costs of the suspension system.

Figure 20:
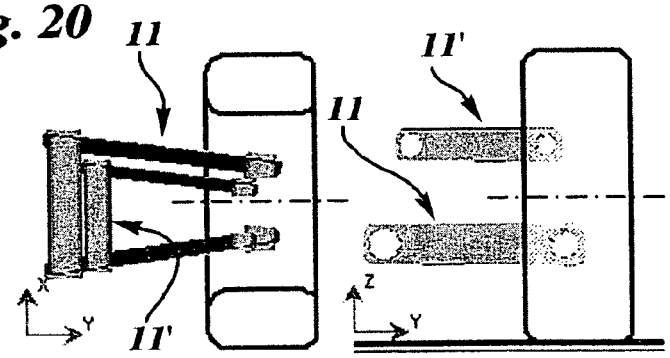

Finally, in FIG. 20, a suspension system comprising a pair of twin-blade arms, that is, an upper arm 11 and a lower arm 11', respectively, is proposed.

The main advantage of an independent suspension system provided with an arm with a plurality of blades according to the present invention is represented by the fact that, in comparison with the prior art, it can provide an improved and much less expensive solution to the compromise between comfort and handling which is typical of any motor-vehicle suspension system.

Moreover, by suitable definition of the geometrical and stiffness characteristics of the arm, the compliance required of the suspension system can be ensured entirely by the resilience of the arm, leaving the articulation bushes (which are preferably made of rubber) substantially solely with the task of providing for insulation from high frequencies. The conventional disadvantage that the compromise between comfort and handling is concentrated in the articulation bushes is thus avoided and an improved distribution of the various operating requirements between the various parts of the system is achieved.

Naturally, the principle of the invention remaining the same, the forms of embodiment and details of construction may be varied widely with respect to those described and illustrated purely by way of non-limiting example.

What is claimed is:

1. An arm for a motor-vehicle independent suspension system designed to be interposed between a wheel carrier and a vehicle body, wherein the arm comprises:

at least two flexible blade-like elements extending substantially transversely and having their transversely outer ends adapted to be connected to the wheel carrier in such a way that the wheel carrier can rotate relative to the arm around a first, substantially longitudinal axis, and their transversely inner ends adapted to be connected to the vehicle body in such a way that the arm can rotate relative to vehicle body around a second, substantially longitudinal axis; and a torsionally stiff connection element which connect the at least two flexible blade-like elements to each other, wherein the planes of the said at least two flexible blade-like elements intersect along a third axis of predetermined orientation, in such a way that the wheel carrier can rotate relative to the vehicle body around the third axis as a result of the deformation of the at least two flexible blade-like elements about the third axis, and wherein the torsionally stiff connection element is interposed between the ends of the blade-like elements.

2. The arm of claim 1, wherein the connection element is connected to the blade-like elements in an intermediate position between their respective ends.

3. The arm of claim 1, wherein the arm comprises two of said torsionally stiff connection elements interposed between the ends of the blade-like elements which are adapted to be connected to vehicle body and to the wheel carrier, respectively.

4. The arm of claim 1, wherein the flexible blade-like elements are formed by two super imposed halves, including and upper half and an lower half, produced by pressing.

5. The arm of claim 1, wherein the connection element is formed from two integral, vertically superimposed, pressed halves, the halves forming the two blade-like elements.

6. The arm of claim 1, wherein the blade-like elements have a rhombic cross-section.

7. A motor-vehicle independent suspension system comprising a transverse arm interposed between a wheel carrier and a vehicle body, wherein the arm comprises:

at least two flexible blade-like elements extending substantially transversely and having their transversely outer ends connected to the wheel carrier in such a way that the wheel carrier can rotate relative to the arm around a first, substantially longitudinal axis, and their transversely inner ends connected to the vehicle body in such a way that the arm can rotate relative to vehicle body around a second, substantially longitudinal axis; and a torsionally stiff connection element which connect the said at least two flexible blade-like elements to each other;

wherein the planes of the said at least two flexible blade-like elements intersect along a third axis of predetermined orientation, in such a way that the wheel carrier can rotate relative to the vehicle body around the third axis as a result of the deformation of the at least two flexible blade-like elements about the third axis, and wherein the torsionally stiff connection element is interposed between the ends of the blade-like elements.

8. The suspension system of claim 7, further comprising a spring and shock absorber unit connected to the arm.

9. The suspension system of claim 7, further comprising an A-arm.

10. The suspension system of claim 7, further comprising a transverse rod capable of reacting both to tension, compression and torsion.

11. The suspension system of claim 7, further comprising a transverse arm having a single point of articulation with respect to the vehicle body.

12. The suspension system of claim 7, further comprising a longitudinal rod capable of reacting solely to torsion.

13. The suspension system of claim 7, further comprising a second arm for a motor-vehicle independent suspension system of the type which is interposed between a respective wheel carrier and the vehicle body and the which can permit at least two degrees of freedom.

14. The suspension system of claim 7, further comprising a spring and shock-absorber unit, connected to the wheel carrier.

15. The suspension system of claim 7, wherein the spring and shock-absorber unit connected to the wheel carrier is a structural unit capable of reacting to lateral and longitudinal loads.

16. The suspension system of claim 7, further comprising a torsion bar connected rigidly to the torsionally stiff connection element.

* * * * *